May 27, 1969  A. E. H. ELMER  3,446,430

FLEXIBLE TORSION COUPLINGS

Filed June 12, 1967

INVENTOR
ARTHUR ERNEST HENRY ELMER
BY
Young & Thompson
ATTORNEYS

United States Patent Office 3,446,430
Patented May 27, 1969

3,446,430
FLEXIBLE TORSION COUPLINGS
Arthur Ernest Henry Elmer, Painswick, England, assignor to Dynair Limited, Gloucestershire, England, a British company
Filed June 12, 1967, Ser. No. 645,145
Claims priority, application Great Britain, June 11, 1966, 26,129/66
Int. Cl. F04d 27/00; F16d 7/02
U.S. Cl. 230—271
9 Claims

ABSTRACT OF THE DISCLOSURE

A flexible torsion transmitting coupling acting as a resilient mounting between a fan and a clutch, the coupling comprising two rubber discs between which the fan hub is clamped, each disc being formed with concentric grooves on both faces, the grooves being offset radially between opposite faces.

---

Figure 1:
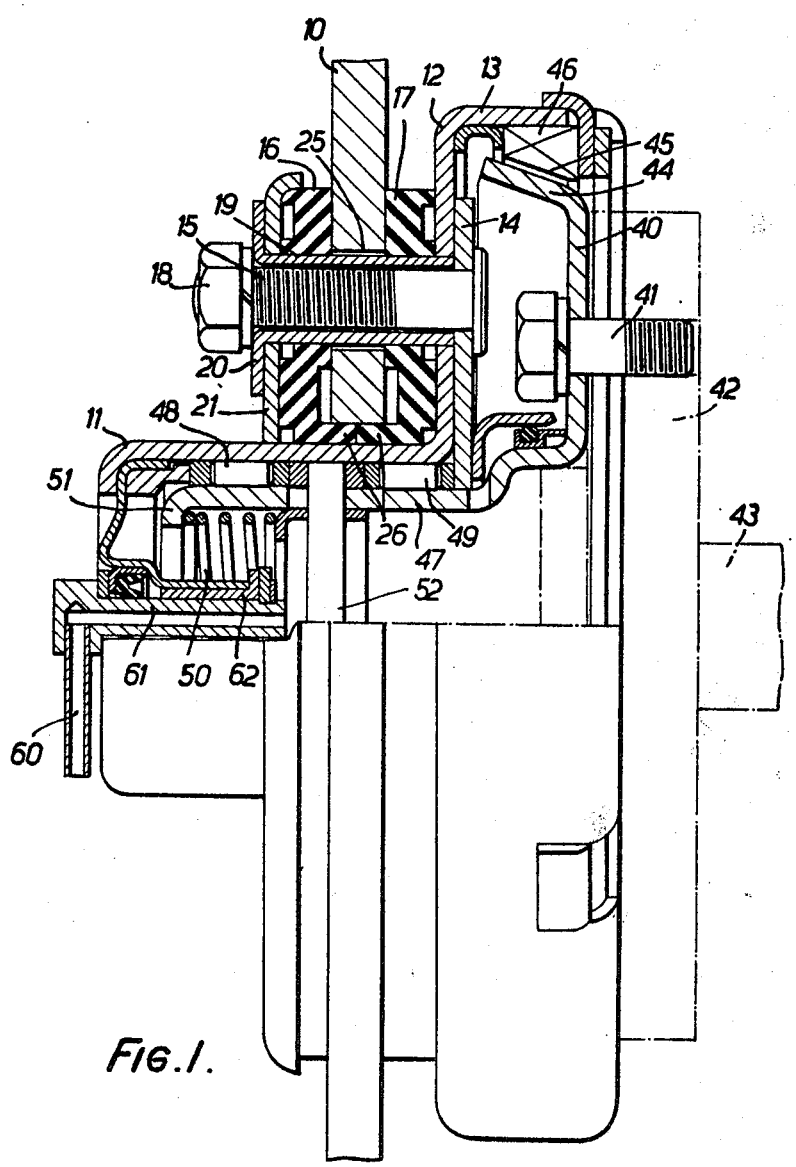

This invention relates to flexible torsion transmitting couplings of the type including an elastomeric element through which the torque is transmitted and which also distorts to provide flexibility between the two sides of the coupling.

It is an object of the invention to provide an improved coupling of the above type which will afford substantial torque transmission while retaining considerable resilience and flexibility in angular displacement, and preferably also in axial, radial, and torsional deflection.

The invention consists essentially in a flexible torsion transmitting coupling comprising an elastomeric member situated between two drive elements so as to permit limited relative angular displacement of the rotary axes of the drive elements, and so arranged that torsion is transmitted through the elastomeric member in shear, at least one of the faces of the elastomeric member, which are in contact with the drive elements, being recessed, thus reducing the contact area and providing increased flexibility.

According to a preferred feature of the invention both faces of the elastomeric member are recessed, and the recesses in the opposite faces may be at least partly offset.

According to another preferred feature of the invention the recesses in the opposite faces are staggered, leaving intervening axially continuous portions of the elastomeric member in contact with both drive elements.

This arrangement provides limited but controlled resilience in an axial direction and at the same time affords large torsion transmitting capability, while allowing considerable flexibility in angular displacement.

Preferably the recesses in the or each face of the elastomeric member are in the form of one or more circular grooves concentric with the axis of rotation of the coupling.

The coupling also preferably includes means for applying axial pressure to the elastomeric member between the two drive elements, the torsional drive being transmitted by friciton between a drive element and the elastomeric member. For example the coupling may include a second elastomeric member on the opposite side of one drive element, which is thus sandwiched between the two elastomeric members, and including a third drive element on the remote side of the second elastomeric member, and clamping means acting between the two outer drive elements, to compress the two elastomeric members.

The invention also resides in a coupling as defined in combination with and mounted directly on, a fluid operated friction clutch.

The invention is particularly applicable to couplings used as mountings for bladed rotary fans. In high powered vehicle engines the torsional requirements for such fan drives are very large but any lack of alignment between the fan blade assembly and the drive member can result in excessive vibration of the fan blades, leading to fracture.

In a preferred embodiment of the invention a flexible coupling as defined is positioned directly on a fluid operated friction clutch and supports a rotary cooling fan on the clutch casing.

Figure 2:
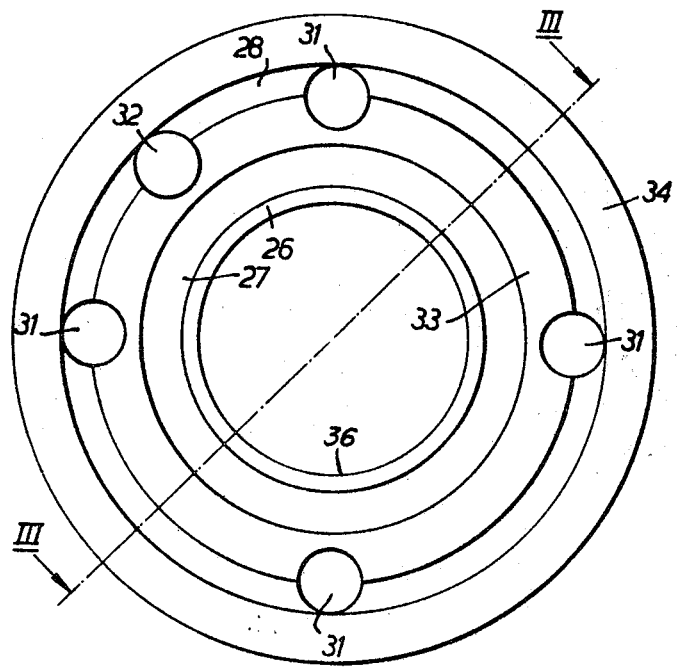
Figure 3:
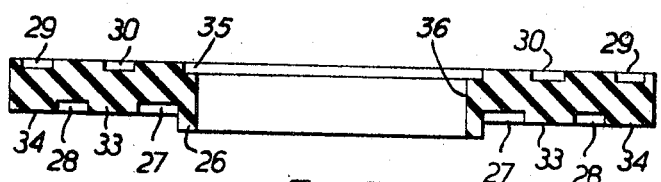

The invention may be performed in various ways and one particular embodiment will now be described by way of example with reference to the accompanying drawings in which FIGURE 1 is a side elevation partly in section showing a rotary fan mounted on a pneumatically operated friction clutch with an intervening flexible coupling, according to the invention, FIGURE 2 is an end view of one of the rubber discs included in the coupling, and FIGURE 3 is a section through the rubber disc of FIGURE 2 on the line III—III.

In this embodiment a number of fixed pitch fan blades (not shown) are secured to an annular hub disc 10 which is resiliently supported by a flexible coupling, as will be described below, from a driven casing member 11 which constitutes part of a pneumatically operated friction clutch. The cylindrical portion of the casing 11 constitutes a pneumatic ram cylinder, and the casing also includes an annular radial flange 12 and a rear cylindrical flange 13 forming part of the clutch. On the rear side of the radial flange 12 there is positioned an annular abutment disc 14 secured to four spaced forwardly projecting screw-threaded studs 15 and the fan disc 10 is frictionally clamped between two rubber discs 16, 17 by means of nuts 18 on the studs 15. The nuts 18 bear on the outer ends of spacer sleeves 19, whose opposite ends abut against the flange 12 so as to limit the axial compression of the rubber discs. The outer flanged ends 20 of the sleeves 19 are also welded to a front clamping plate 21, both the plate 21 and the flange 12 having aligned apertures to receive the studs 15. The fan disc 10 is formed with oversize apertures 25 surrounding each spacer sleeve 19 with appreciable clearance, thus permitting the necessary degree of flexibility of the fan disc relative to the casing 10, and the inner edge of the fan disc is also engaged by annular projecting ribs 26 on the inner portions of the two rubber discs.

Each of the rubber discs 16, 17, is shaped as shown particularly in FIGURES 2 and 3. In the inner face of the disc shown in FIGURE 2, which will engage the fan disc 10, there are provided two concentric annular grooves 27, 28, and in the outer face are formed two concentric annular grooves 29, 30, and also an annular recess 35 around the central aperture 36. The grooves 27, 28, 29, 30, are offset in a radial direction so that the centre lines of the grooves have different radii, and furthermore it will be noted that the grooves do not overlap radially as shown in FIGURE 3. In other words there is a small radial dimension or interval between each pair of grooves on opposite faces. This provides in effect a number of solid rubber cylindrical rubber "tubes" separating the grooves and extending directly and continuously between the two opposite faces of the disc. The radial dimensions of these "tubes," and of the grooves, provide means for controlling the stiffness of the rubber against axial compression.

Each disc has four apertures 31, and on its inner face is also formed with a boss 32 which engages a corresponding aperture in the fan disc 10 to assist in locating the fan disc during assembly.

It will be noted that each rubber disc only contacts the fan disc 10 on two annular pressure areas 33, 34, and around the side wall of the rib 26. The torsional drive between the rubber discs and the fan disc 10 results from the frictional contact between the fan disc and the annular pressure areas 33, 34, of the rubber. Since the apertures 25 in the fan disc 10, which surround the spacer sleeves 19, are over-size, the disc 10 has no metal-to-metal contact with any part of the mounting, and as a result of distortion of the rubber discs the fan disc 10 can tilt slightly relative to the casing 11, and can also undergo small torsional, radial, and/or axial displacements, all such movements being resiliently cushioned by the rubber.

The illustrated formation of the rubber discs provides a contact area on each face which is substantially less than the full cross-sectional area through the main body of the rubber. The construction affords considerable "softness" against distortion in an axial direction, thus allowing the fan disc 10 to tilt quite easily relative to the casing 11, and this is very effective in reducing vibration or "wobble" of the fan disc when rotating at high speeds. At the same time the construction permits very substantial torque to be transmitted to the fan through the rubber discs, this torsional force being transmitted principally by shear stress in the rubber, which is preferable to compressive stress since it provides a greater range of torsional displacement and therefore acts better to absorb any torsional oscillations in the drive to the fan.

The pneumatically operated clutch contained within the casing 11 is described in full detail in copending U.S. application No. 564,135, filed July 11, 1966, and will therefore only be described briefly herein.

The driving member of the clutch is in the form of a metal pressing 40 secured by bolts 41 to a driving flange 42 on the front end of the drive shaft 43 of a vehicle engine. The outer lip 44 of this member 40 is conically shaped to co-operate with a tapered surface 45 on a friction ring 46 carried by the part 13 of the clutch casing. It will be seen that when the friction ring 46 moves forwardly it will engage the conical lip 44, and the clutch will be engaged. The driving member 40 of the clutch is also formed integral with a cylindrical extension 47, constituting a pneumatic ram piston, and the casing 11 is supported on and around this extension 47 by means of two needle roller bearings 48, 49. A helical compression spring 50 acts between an inturned lip 51 on the extension 47, and a transverse pin 52, which is located between the needle roller bearings 48, 49. The spring 50 thus tends to urge the casing 11 and the friction ring 46 rearwardly in relation to the driving member 40, and thus tends to disengage the clutch.

Compressed air to operate the clutch is admitted from a line 60 via a hollow air inlet spigot 61 positioned on the centre line of the fan, and supported by an oil impregnated bushing 62.

When compressed air is admitted through the line 60 it enters the space within the cylindrical extension 47 of the driving member, and it will be appreciated that the rear end of this space is closed by the driving flange 42 on the drive shaft. The air within the interior of the cylindrical extension 47 is thus trapped and exerts a forward thrust on the casing 11 so as to engage the friction ring 46 with the driving lip 44. It will also be noted that the reaction thrust of the fan blades, acting forwardly, is in a direction to assist this engagement. The clutch thus engages and the fan is driven by the drive shaft.

A particular advantage of the described flexible coupling when used in conjunction with a friction clutch as illustrated is that the coupling reduces the torsional vibrations and the out-of-balance forces exerted by the fan on the clutch casing. These forces might otherwise become very considerable and might rapidly destroy the roller bearings 48, 49, or limit the effectiveness of the bearings so that the fan will be driven even when the clutch is disengaged.

It will be understood however that the flexible coupling of the invention is applicable generally to any situation requiring a flexible torsion-transmitting device, for example between two shafts, and the coupling may also be combined with a friction clutch in such applications.

It will also be understood that the elastomeric member or members may take various forms and the invention is not limited to the specific form disclosed.

I claim:

1. A flexible torsion transmitting coupling, comprising an elastomeric member situated between two drive elements so as to permit limited relative angular displacement of the rotary axes of the drive elements, and so arranged that torsion is transmitted through the elastomeric member in shear, at least one of the faces of the elastomeric member, which are in contact with the drive elements, being recessed, thus reducing the contact area and providing increased flexibility.

2. A coupling as claimed in claim 1, in which both faces of the elastomeric member are recessed.

3. A coupling as claimed in claim 2, in which the recesses in the opposite faces are at least partly offset.

4. A coupling as claimed in claim 3, in which the recesses in the opposite faces are staggered, leaving intervening axially continuous portions of the elastomeric member in contact with both drive elements.

5. A coupling as claimed in claim 1, in which the recesses in the or each face of the elastomeric member are in the form of one or more circular grooves concentric with the axis of rotation of the coupling.

6. A coupling as claimed in claim 1, including means for applying axial pressure to the elastomeric member between the two drive elements, the torsional drive being transmitted by friction between a drive element and the elastomeric member.

7. A coupling as claimed in claim 1, including a second elastomeric member on the opposite side of one drive element, which is thus sandwiched between the two elastomeric members, and including a third drive element on the remote side of the second elastomeric member, and clamping means acting between the two outer drive elements, to compress the two elastomeric members.

8. A coupling as claimed in claim 1, in combination with and mounted directly on, a clutch.

9. A bladed rotary cooling fan, incorporating a flexible coupling as claimed in claim 1, the fan blade assembly constituting one drive element, while the fan driving member constitutes the other drive element.

References Cited

UNITED STATES PATENTS

| | | | |
|---|---|---|---|
| 2,786,456 | 3/1957 | Heiss | 230—271 X |
| 3,209,993 | 10/1965 | Seifert | 64—30 X |
| 2,822,657 | 2/1958 | Chaffee | 64—30 X |
| 3,157,978 | 11/1964 | McMullen | 64—30 X |

ROBERT M. WALKER, *Primary Examiner.*

LEONARD H. GERIN, *Assistant Examiner.*

U.S. Cl. X.R.

64—30